G. SCHNURR.
MOTOR SLED.
APPLICATION FILED JULY 22, 1915.

1,220,278.

Patented Mar. 27, 1917.
2 SHEETS—SHEET 1.

Witnesses
Edw. S. Hall.
Wm. Webster Downing.

Inventor
George Schnurr.
By Richard B. Owen.
Attorney

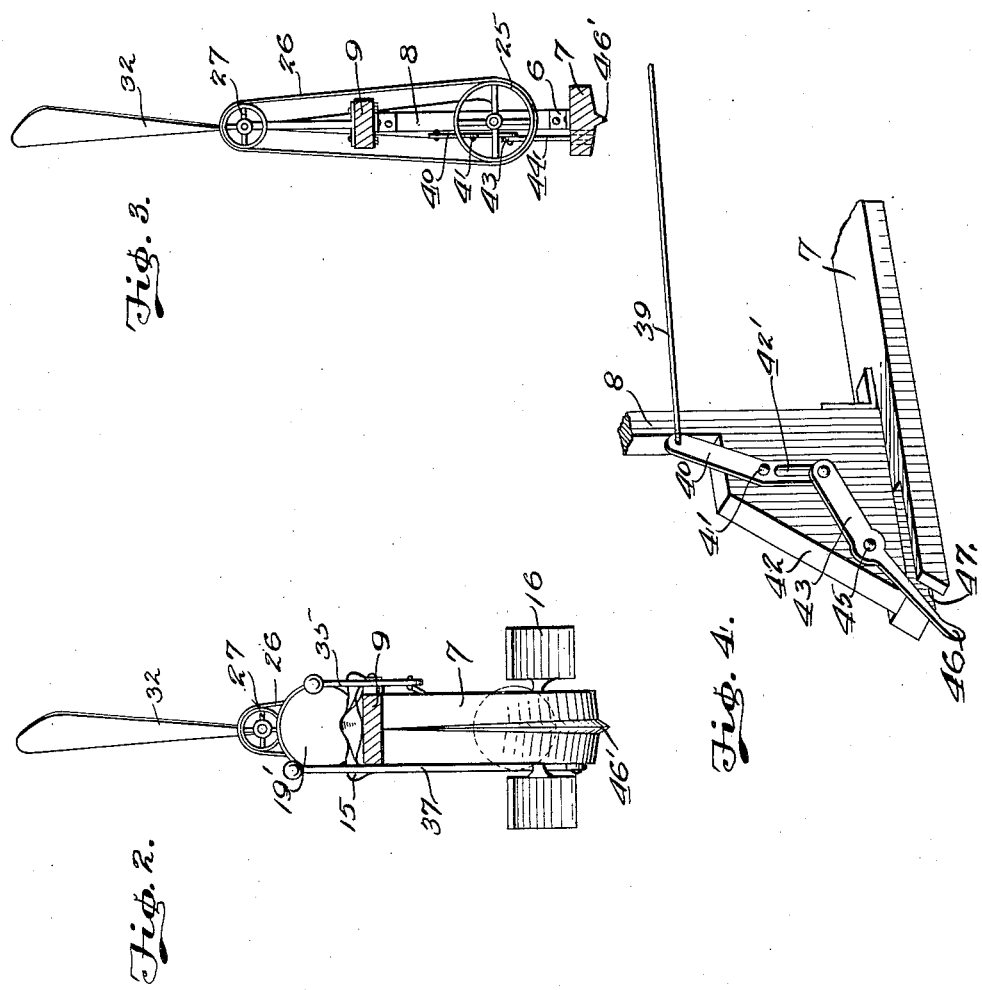

UNITED STATES PATENT OFFICE.

GEORGE SCHNURR, OF FARMINGTON, WASHINGTON.

MOTOR-SLED.

1,220,278.	Specification of Letters Patent.	Patented Mar. 27, 1917.

Application filed July 22, 1915.  Serial No. 41,377.

*To all whom it may concern:*

Be it known that I, GEORGE SCHNURR, a citizen of the United States, residing at Farmington, in the county of Whitman and State of Washington, have invented certain new and useful Improvements in Motor-Sleds, of which the following is a specification.

My invention relates to motor sleds.

The primary object of my invention resides in the provision of a novel motor sled comprising single forward and rear runners, the latter adapted for receiving the operator of the sled, novel steering means being connected to the forward runner and arranged in proximity to the seat on the rear runner for permitting of the efficient guiding of the sled while it is being operated. Means are also positioned and arranged in a novel manner on the rear runner for controlling the operation of the motor and for applying the brake means.

Another object of my invention resides in the novel means for mounting the motor as well as the air propelling means.

A further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:

Fig. 2 is a transverse sectional view taken on the line 2—2 of Fig. 1;

Fig. 3 is a transverse sectional view taken on the line 3—3 of Fig. 1; and

Fig. 4 is an enlarged fragmentary perspective view of the rear end of the rear runner illustrating to advantage the peculiar manner of associating the brake means therewith.

Figure 1:
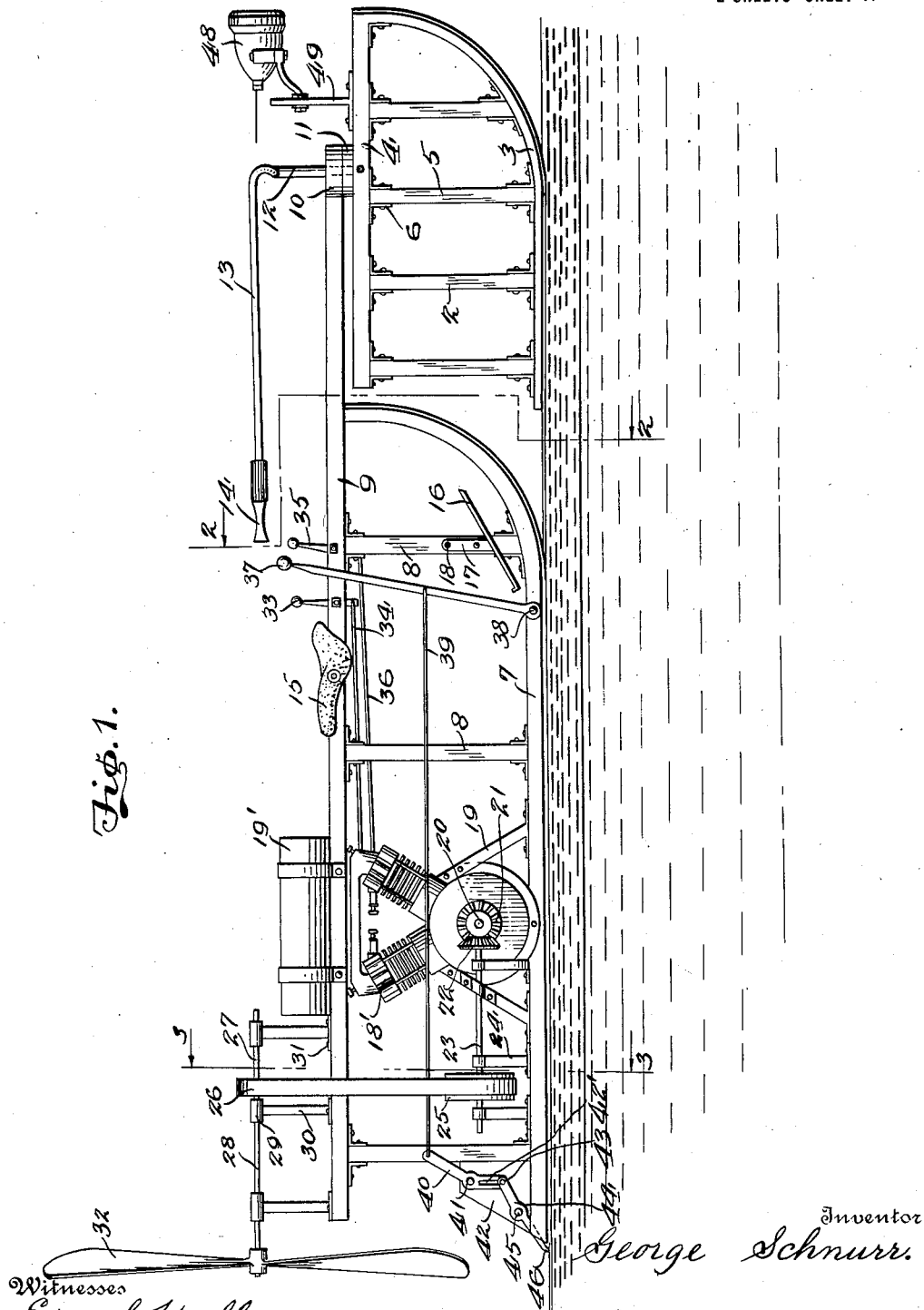
Figure 1 is a side elevational view of my invention.

Referring more particularly to the drawings in which similar reference numerals designate like or corresponding parts throughout the different views, I provide a sled comprising essentially a single rear runner 1 and a single front runner 2, the latter comprising a curved base member 3 and a horizontally disposed beam 4, the beam and the base member being connected by vertical supports 5, connection being made preferably through the medium of suitable brackets 6. The rear runner is substantially longer than the forward runner and slightly higher and comprises a similarly formed base member 7, vertical supports 8 and a horizontally disposed beam 9, the forward end of which is extended longitudinally thereof and constitutes a reach, the extreme outer end thereof being provided with a bearing 10. This bearing 10 rests upon a bearing 11 suitably secured at a point substantially intermediate the ends of the beam 4 of the forerunner, and both bearings 10 and 11 receive the inner end 12 of the handle bar 13. These peculiar, yet novelly formed bars extend rearwardly of the forerunner and in spaced parallel relation with the beam 9, the free recessed end engaging portions 14 terminating adjacent the operator's seat 15, suitably mounted adjacent the forward end of the rear runner. In order to support the feet of the operator while the machine is being operated in the manner to be hereinafter described, substantially rectangular feet supporting plates 16 are arranged at a substantially acute angle to the surface and bracketed in this position to both sides of the vertical support 8 through the medium of angular portions 17 and fastening devices 18.

In order to propel the sled, I have mounted an engine 18' on the base member 7 of the rear runner through the medium of brackets 19. This engine may be of any desirable type, preferably similar to those used on the ordinary motorcycle. A supply tank 19' is suitably mounted on the upper surface of the beam 9 and is also arranged in communication with the engine. The engine shaft 20 carries the bevel gear 21 which is arranged in mesh with a similarly formed bevel gear 22 carried on the one end of a horizontally disposed shaft 23. The shaft 23 is rotatably mounted in the journals formed at the upper end of the standards 24 supported on the base member. The pulley wheel 25 is carried adjacent the opposite end of the bracket and on which pulley operates a belt 26, the latter being also trained about a similar pulley wheel 27 rigidly carried on the propeller shaft 28. The propeller shaft is rotatably mounted in the journals 29 formed at the upper ends of the vertical standards 30, said standards being suitably connected by means of fastening devices 31 to the upper surface of the rear end of the beam 9. The extreme rear end of the propeller shaft projects beyond the plane of the rear end of the rear runner and has an air propeller 32 mounted thereon.

In order to control the operation of the engine from a point adjacent the driver's seat, I have pivotally mounted a small hand lever 33 to the beam 9 in a position forward of the seat, the extreme lower end of the lever having a connecting rod 34 pivoted thereto, the opposite end of the rod being associated with the engine to control the flow of the fuel. A similarly formed hand lever 35 is also pivoted to the same side of the beam, the lower end thereof being in pivotal connection with a rod 36, which rod is associated with the spark in order that the handle lever 35 can be operated to control the spark.

For the purpose of causing the device to come to a standstill, when desired, or when it is desired to lessen the speed of the device, I have provided my improved braking means in this instance constituted especially of an elongated hand lever 37 pivotally connected as at 38 to the base member 7 on the opposite side of the rear runner than that to which the hand levers 33 and 35 are connected. An elongated connecting rod 39 is pivoted preferably intermediate the ends of this lever and has the opposite end thereof pivotally connected to one end of a substantially bell crank lever 40. This lever 40 is pivotally connected through the medium of any suitable means 41 to a block 42, said block being rigidly connected to the rear vertical support 8 and the base member 7. The opposite end of the bell crank lever 40 is provided with a longitudinal slot 42' in which is movably connected, preferably through the medium of a pin 43, the inner end of a brake lever 44. The brake lever is also pivotally connected to the block through the medium of a pin 45 and has the extreme free end reduced and sharpened to provide a brake point 46, the latter being adapted to operate within a longitudinal slot 47 in the rear edge of the rear runner and to engage the frozen surface. In order that the controlling of the vehicle may be facilitated, I have found it desirable to employ runners having substantially triangular shaped longitudinally arranged ribs 46' on the under surfaces thereof. The sharpened edges of these ribs engage the ground and due to the weight of the sled reduce skidding of the sled to a minimum when the device is being turned.

For the purpose of making the device useful in the night time, I have adjustably mounted a search light 48 of any desirable type to a lamp supporting standard 49 rigidly connected adjacent the forward end of the front runner. It is obvious that when the device is turned, the lamp will also be turned and the rays therefrom will be thrown in the path which the sled is assuming.

The operation of my invention is as follows:

Assuming that it is desired to travel forwardly on the sled, the operator, through the medium of the gas and spark control levers 33 and 35 respectively adjusts the gas and spark of the engine and by giving the propeller a turn, the device is started, movement being transmitted from the engine through the medium of the horizontal shafts 23 and 28 connected for transmitting motion through the medium of the belt 26. Guiding of the sled is facilitated through the medium of the handle bars 13. In decreasing the speed of the vehicle, the handle 37 is moved forwardly and consequently causing the bell crank lever to move forwardly and upwardly, simultaneously causing the pointed end 36 of the brake to engage the surface.

Although I have shown and described the preferred embodiment of my invention, I desire to be understood that I am not to be limited to the exact details shown, however, I desire that great stress be laid upon the motor driven sled comprising single forward and rear runners suitably connected, as well as the guiding means thereof positioned adjacent the operator.

From the above description taken in connection with the accompanying drawings, it can easily be seen that I have provided a device that is simple in construction, containing but a few simple parts that can be cheaply manufactured and assembled and when assembled can be placed upon the market and sold at minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. A motor sled comprising a runner, a frame comprising uprights supported on the runners, a bar extending longitudinally on the runner and secured at the upper ends of the uprights, a motor supported by the frame and disposed between said bar and runner, an air propelling blade rotatably mounted at the rear of the sled, means between the motor and the blade for transmitting motion to the latter, the forward end of said bar being extended beyond the runner, a second runner pivotally connected to the extended end of the bar and arranged in alinement with the second runner, and steering handles extending rearwardly from said second runner.

2. A motor sled comprising a runner, a frame comprising uprights supported on the runner, a bar extending longitudinally on the runner and secured at the upper ends of the uprights, a motor supported by the frame and disposed between said bar and runner, an air propelling blade rotatably mounted at the rear of the sled, means between the motor and the blade for transmitting motion to the latter, the forward end of said bar being extended beyond the runner, a second runner pivotally connected to the extended end of the bar and arranged in alinement with the second runner, a seat disposed upon said bar and over said first mentioned runner, a foot rest on opposite sides of the frame and secured thereto adjacent said seat, and steering handles extending from the first runner rearwardly to a point adjacent said seat.

3. A motor sled comprising a runner, a frame supported by the runner and including uprights and a bar extended longitudinally of the runner and secured to said uprights, the forward end of the bar being extended beyond the runner, a motor supported on the frame between said runner and said bar, a shaft rotatably mounted on the frame, an air propelling wheel mounted on the shaft, a fly wheel mounted on the frame and having an inoperative connection with the motor, means between said fly wheel and said shaft for transmitting motion to the latter, a seat mounted on the frame, a foot rest disposed on each side of the frame and secured thereto at a point near the seat, a second runner arranged in front of the first mentioned runner and in alinement therewith, a frame supported by the second runner and rotatable with the extended end of said bar, and steering handles extended from the runner rearwardly to a point adjacent the seat.

In testimony whereof I affix my signature in presence of two witnesses.

GEORGE SCHNURR.

Witnesses:
 DEWEY CONGER,
 Mrs. JOE SCHNURR.